(12) United States Patent
Asano et al.

(10) Patent No.: US 7,420,588 B2
(45) Date of Patent: Sep. 2, 2008

(54) MEASURING METHOD, MEASURING SYSTEM AND STORAGE MEDIUM

(75) Inventors: Hidemitsu Asano, Kawasaki (JP); Yasuo Sugita, Kawasaki (JP); Koichi Komatsu, Kawasaki (JP); Sadayuki Matsumiya, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 1055 days.

(21) Appl. No.: 10/726,686

(22) Filed: Dec. 4, 2003

(65) Prior Publication Data

US 2004/0109205 A1    Jun. 10, 2004

Related U.S. Application Data

(63) Continuation-in-part of application No. 09/579,009, filed on May 26, 2000, now abandoned.

(30) Foreign Application Priority Data

Jun. 9, 1999    (JP)    ............... 11-161783

(51) Int. Cl.
    *H04N 7/18*    (2006.01)
(52) U.S. Cl. .......................... 348/94; 348/95
(58) Field of Classification Search ............. 348/86–95, 348/125–141
    See application file for complete search history.

(56) References Cited

U.S. PATENT DOCUMENTS

| | | | |
|---|---|---|---|
| 4,920,273 A * | 4/1990 | Sacks et al. ............ | 250/559.08 |
| 5,255,199 A | 10/1993 | Barkman et al. ............ | 700/175 |
| 5,956,253 A | 9/1999 | Gottschalk .................. | 700/186 |
| 6,064,759 A | 5/2000 | Buckley et al. ............. | 382/154 |
| 6,084,663 A * | 7/2000 | Seng ....................... | 356/237.4 |
| 6,269,179 B1 * | 7/2001 | Vachtsevanos et al. ...... | 382/149 |
| 6,414,711 B2 | 7/2002 | Arimatsu et al. ............. | 348/86 |

FOREIGN PATENT DOCUMENTS

| | | |
|---|---|---|
| JP | 08-014876 | 1/1996 |
| JP | 08-313217 | 11/1996 |

(Continued)

OTHER PUBLICATIONS

Fang et al., "Stereo Vision and CMM Integrated Intelligent Inspection System in Reverse Engineering", Proceedings of the SPIE—The International Society for Optical Engineering, vol. 3521, Nov. 4, 1998, pp. 115-122.

(Continued)

*Primary Examiner*—Andy S Rao
(74) *Attorney, Agent, or Firm*—Oliff & Berridge, PLC

(57) ABSTRACT

There are provided a measuring method and a measuring system which enable creation of a measurement route with ease to thereby enable three-dimensional measurement to be quickly performed even if an object to be measured has a complicated shape or configuration. An object to be measured is shot. A plurality of images obtained by the shooting are combined together to generate a combined image of the object. A measuring region of the generated combined image is designated. A measurement path measuring program is created by inputting parameters for creating a measurement path. The designated measuring region is measured along the measurement path according to the created measurement path measuring program.

7 Claims, 14 Drawing Sheets

FOREIGN PATENT DOCUMENTS

| | | |
|---|---|---|
| JP | 10-078317 | 3/1998 |
| JP | 10-090284 | 4/1998 |
| JP | 11-351858 | 12/1999 |

OTHER PUBLICATIONS

Chan et al., "Neural Network Stereo Image Segmentation for Directed Coordinate Measuring Machine Part Programming", IEEE Pacific Rim Conference on Communications, Computers and Signal Processing, Aug. 20, 1997, pp. 547-550.

Wang et al., "A vision-aided alignment datum system for coordinate measuring machines", Measurement Science and Technology, vol. 8, No. 7, Jul. 1, 1997, pp. 707-714.

Oltzscher et al., "Hochauflösende Bildmeβtechnik—High resolution imaging technology", Technisches Messen TM, vol. 60, No. 5, May 1, 1993, pp. 204-210.

Wang et al., "The use of a machine vision system in a flexible manufacturing cell incorporating an automated coordinate measuring machine", Proceedings of the Institution of Mechanical Engineers, Part B, vol. 207, No. B3, 1993, pp. 199-202.

Labs, "Laser sensors pay off in accuracy", I & CS—Industrial and Process Control Magazine, vol. 64, No. 7, Jul. 1, 1991, pp. 51-53.

* cited by examiner

MAIN SCREEN VIEW

MEASURING METHOD, MEASURING SYSTEM AND STORAGE MEDIUM

CROSS-REFERENCE TO RELATED APPLICATION

The present application is a continuation-in-part of U.S. application Ser. No. 09/579,009, filed on May 26, 2000, now abandoned, the entire text of which is incorporated herein by reference.

BACKGROUND OF THE INVENTION

1. Field of the Invention

The present invention relates to a measuring method and a measuring system which measures an object to be measured by creating a measurement route (measurement path), and a storage medium storing a program for implementing the measuring method.

2. Description of the Related Art

Conventionally, there has been known a three-coordinate measuring system which measures the position of an object to be measured using a non-contact displacement gauge such as a laser probe. In such a measuring system, a measurement route is created by manually setting a pattern of the measurement route and various parameters for the pattern according to the shape or configuration of an object to be measured, prior to the measurement.

However, with the manual setting, if the object to be measured has a complicated shape or configuration, the setting of the pattern of the measurement route and various parameters for the pattern is very difficult to perform, so that the creation of the measurement route requires a great deal of time.

SUMMARY OF THE INVENTION

It is an object of the present invention to provide a measuring method and a measuring system which enable creation of a measurement route with ease to thereby enable three-dimensional measurement to be quickly performed even if an object to be measured has a complicated shape or configuration, and a storage medium storing a program for implementing the measuring method.

To attain the above object, according to a first aspect of the present invention, there is provided a measuring method comprising the steps of shooting an object to be measured, combining together a plurality of images obtained by the shooting to generate a combined image of a whole of the object, designating a measuring region of the generated combined image of the whole of the object, creating a measurement path measuring program by inputting parameters for creating a measurement path, and measuring the designated measuring region along the measurement path according to the created measurement path measuring program.

Preferably, the step of creating the measurement path measuring program comprises inputting at least one first parameter required for measurement in X-axis and Y-axis directions to create the measurement path measuring program, and then inputting at least one second parameter required for measurement in a Z-axis direction to finalize the measurement path measuring programinputting at least one first parameter required for measurement in X-axis and Y-axis directions to create the measurement path measuring program, and then inputting at least one second parameter required for measurement in a Z-axis direction to finalize the measurement path measuring program.

More preferably, the step of shooting the object comprises shooting part of the object with a camera attached to a measuring tool for use in measuring the object, while moving the camera and the object relative to each other.

Preferably, the measuring method further comprises a step of displaying the combined image, and wherein the step of designating the measuring region comprises designating the measuring region by painting a specific color on the displayed image of the object.

More preferably, the measuring method further comprises a step of displaying the created measurement path in a manner being superimposed on the displayed combined image of the object.

Also preferably, the measuring method further comprises a step of setting a range of image pickup by the camera by designating a starting point and a terminating point with respect to the object for shooting.

To attain the above object, according to a second aspect of the present invention, there is provided a measuring system comprising shooting means for shooting an object to be measured, image generating means for combining together a plurality of images obtained by the shooting to generate a combined image of a whole of the object, designating means for designating a measuring region of the generated combined image of the whole of the object, program creating means for creating a measurement path measuring program by inputting parameters for creating a measurement path, and measuring means for measuring the designated measuring region along the measurement path according to the created measurement path measuring program.

To attain the above object, according to a third aspect of the present invention, there is provided a storage medium storing a program for causing a computer to execute a measuring method, comprising a module for shooting an object to be measured, a module for combining together a plurality of images obtained by the shooting to generate a combined image of a whole of the object, a module for designating a measuring region of the generated combined image of the whole of the object, a module for creating a measurement path measuring program by inputting parameters for creating a measurement path, and a module for measuring the designated measuring region along the measurement path according to the created measurement path measuring program.

The setting of the range of image pickup by the camera by designating the starting point and the terminating point with respect to the object may be made by directly moving the camera to a desired starting point and a desired terminating point, or alternatively coordinates of desired starting and terminating points may be input by a key operation.

The measuring region may be designated by painting a specific color such as red on an image of the object to be measured, pasted on a screen view according to paint software. Alternatively to painting a specific color, the measuring region may be enclosed by lines using a pen tool, or the enclosed region may be highlighted such that black and white are reversed. For example, in the case where a workpiece is shot against the light by a monochromatic camera, the resulting image is such that holes formed in the workpiece are bright due to light passing through the holes, and the other portions are dark. The bright portions and the dark portions are reversed to indicate the measuring region.

Further, patterns of the measurement path may be registered in at least one program in advance, and one of the registered patterns may be selected to select a desired measurement path. Such selectable patterns of the measurement path may include a pattern moving in a reciprocating manner in an X-axis direction at a set measurement pitch, a spiral pattern, a concentric-circular pattern, and others. Selection of these patterns may be made using a dialogue box displayed on a screen view.

The measuring tool may be an optical laser probe, and a contact touch sensor, for example.

According to the present invention, an operator can set a measurement path or measurement route with ease to thereby enable three-dimensional measurement to be quickly performed merely by designating a measurement region of an image obtained by shooting an object to be measured and inputting parameters for creating the measurement path, even if the object to be measured has a complicated shape or configuration.

The above and other objects of the present invention will become more apparent from the following drawings taken in conjunction with the accompanying drawings.

DETAILED DESCRIPTION OF PREFERRED EMBODIMENTS

The present invention will be described below with reference to the drawings showing a preferred embodiment thereof.

Figure 1:
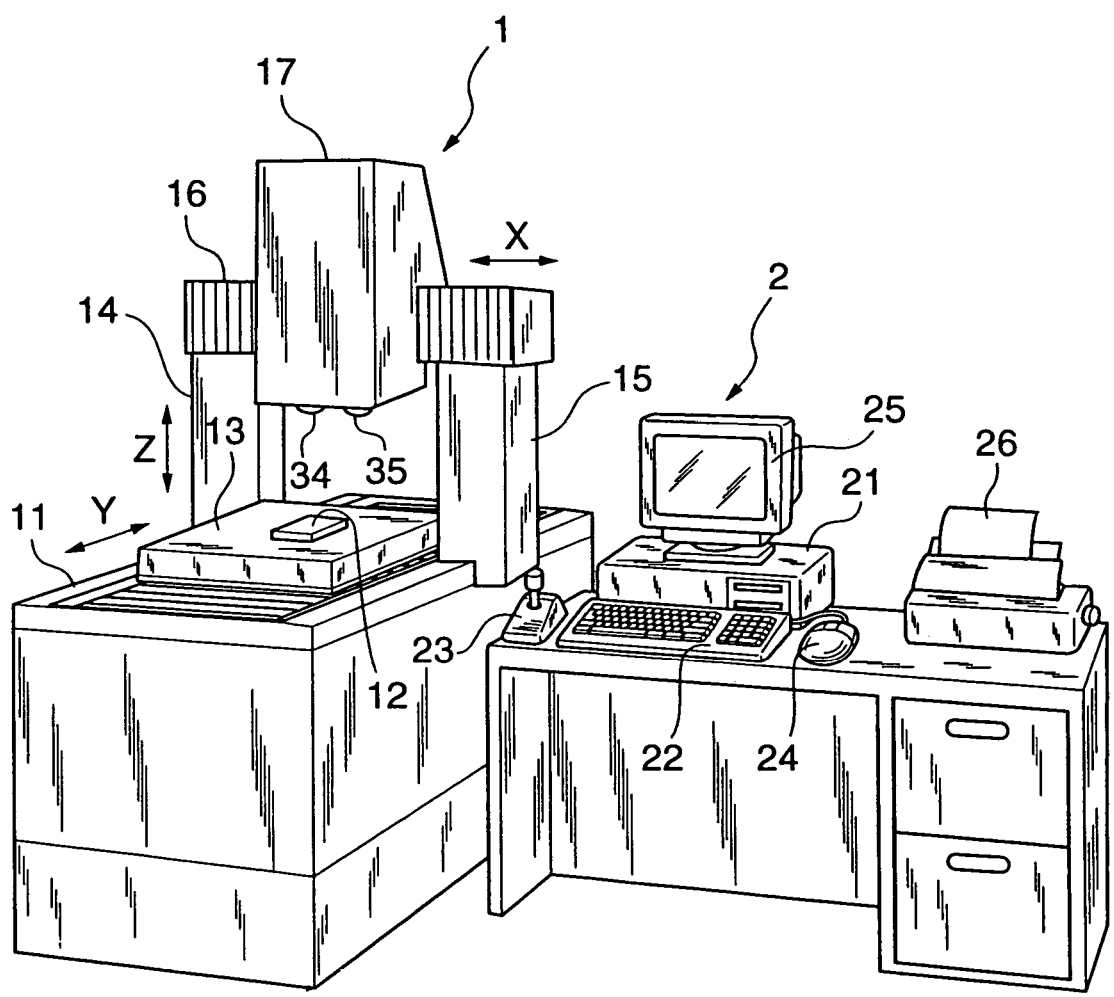
FIG. 1 is a perspective view showing the entire construction of a measuring system according to an embodiment of the present invention.

FIG. 1 is a perspective view showing the entire construction of a measuring system according to an embodiment of the present invention. The measuring system according to the present embodiment is a three-coordinate measuring system using a laser probe.

The thee-coordinate measuring system is comprised of a three-coordinate measuring machine 1 having a non-contact image measurement function and a non-contact displacement measurement function, and a computer system 2 that controls driving of the three-coordinate measuring machine 1 and performs required data processing.

The three-coordinate measuring machine 1 has a base 11, on which a measuring table 13 with a workpiece 12 to be measured placed thereon is mounted. The measuring table 11 is driven in a Y-axis direction by a Y-axis drive mechanism, not shown.

A pair of upwardly extending support arms 14 and 15 are erected on opposite lateral edges of the base 11 at intermediate locations thereof, and an X-axis guide 16 is rigidly mounted on the support arms 14, 15 in a fashion connecting between upper ends of the support arms 14, 15. An image pickup unit 17 is supportedly fitted on the X-axis guide 16 and is driven along the X-axis guide 16 by an X-axis drive mechanism, not shown.

The computer system 2 is comprised of a computer 21 that performs measurement information processing and various controls, a keyboard 22 that inputs various kinds of instruction information, a joy stick 23 and a mouse 24, a CRT display 25 that displays measurement screen views, instruction images, and measurement results, and a printer 26 that performs printout of the measurement results.

Figure 2:
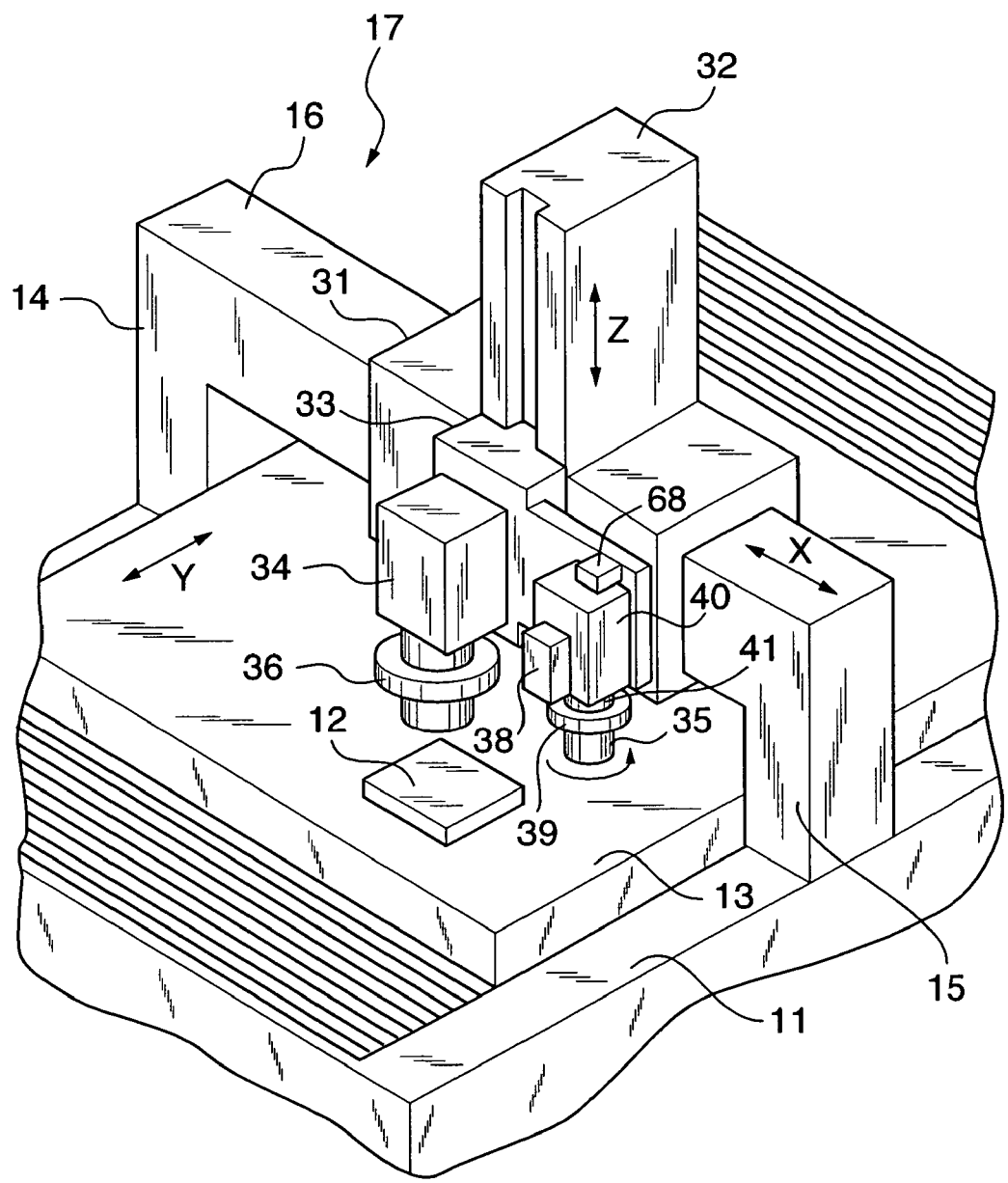
FIG. 2 is a perspective view showing the construction of an image pickup unit 17.

FIG. 2 is a perspective view showing the construction of the image pickup unit 17. In the image pickup unit 17, there is provided a slider 31 that is disposed for sliding movement along the X-axis guide 16. A Z-axis guide 32 is rigidly secured to the slider 31 for movement in unison therewith. The Z-axis guide 32 carries a support plate 33 that is movable in a Z-axis direction. The support plate 33 in turn carries a CCD camera 34 as shooting means for image measurement, and a laser probe 35 as a non-contact displacement gauge.

With this construction, the CCD camera 34 and the laser probe 35 can move together in three directions, i.e., X-axis, Y-axis, and Z-axis directions while being maintained in a fixed positional relationship.

The CCD camera 34 is provided with an illuminating device 36 for illuminating a shooting range. Provided in the vicinity of the laser probe 35 are a CCD camera 38 that shoots an area to be measured by a laser beam of the laser probe 35 to help to confirm the area to be measured, and an illuminating device 39 for illuminating the area to be measured by the probe 35.

The laser probe 35 is supported by a vertical motion mechanism 40 and a rotating motion mechanism 41. The vertical motion mechanism 40 serves to move the laser probe 35 into a turnout when the image pickup unit 17 is moved, and the rotating motion mechanism 41 adjusts or changes the laser beam direction to an optimal direction.

Figure 3:
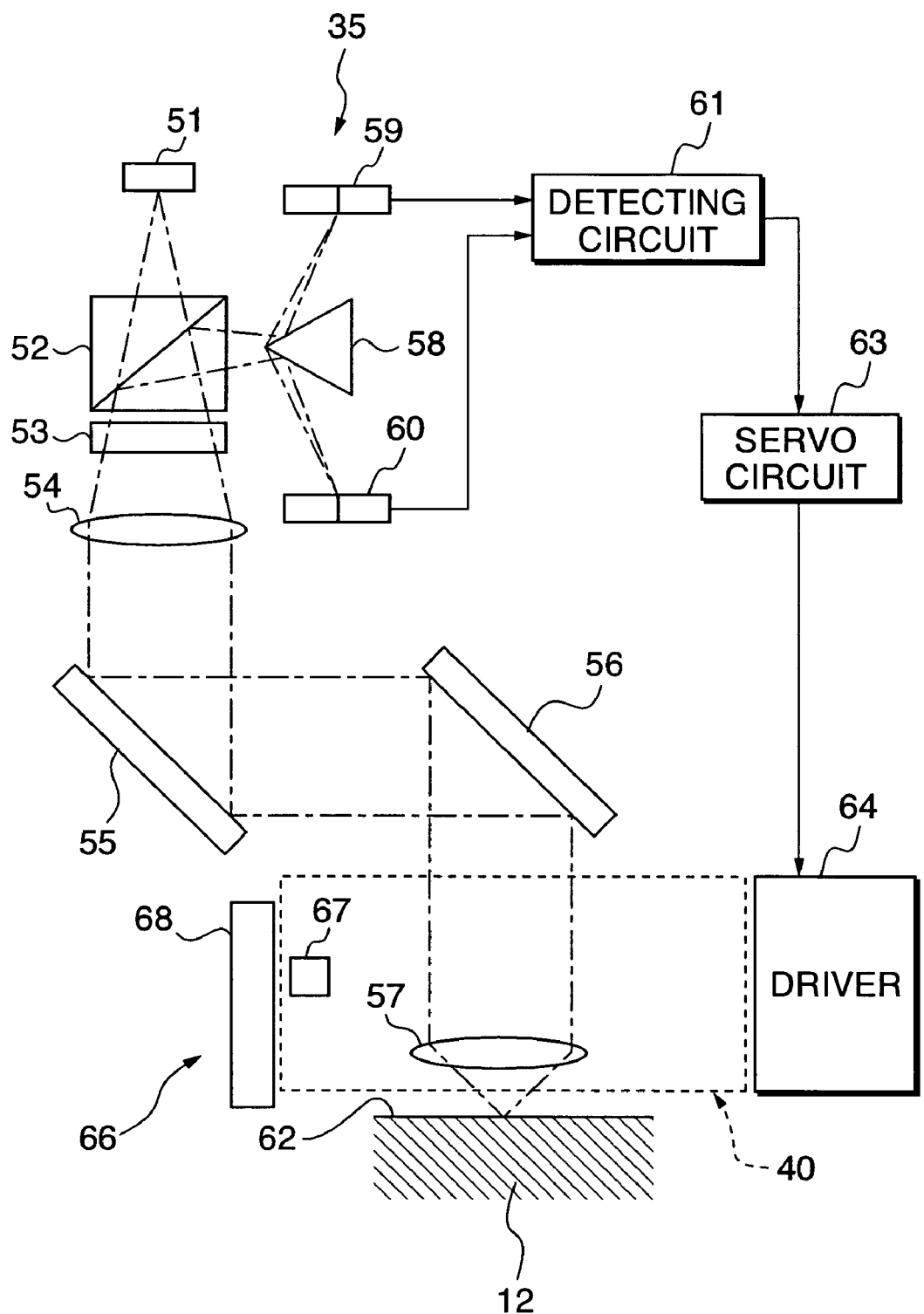
FIG. 3 is a diagram showing the optical structure of a laser probe.

FIG. 3 shows the optical structure of the laser probe 35. Light emitted from a semiconductor laser 51 passes through a beam splitter 52 and a quarter wavelength plate 53 and is changed into parallel beams by a collimator lens 54, and then the parallel beams pass through mirrors 55 and 56 and an objective lens 57 to form a light spot on a portion of the workpiece 12 to be measured.

Light reflected from the measuring portion of the workpiece 12 passes through the mirrors 56, 55, collimator lens 54, and the quarter wavelength plate 53 inversely to the above path, and is reflected by the beam splitter 52 and split into upward and downward streams by an edge mirror 58.

The split or upward and downward light streams are detected by half-split light receiving devices 59 and 60. A detecting circuit 61 receives output signals from the light receiving devices 59, 60 and generates an output signal indicative of an amount of deviation between the focal point of the objective lens 57 and the measuring surface of the workpiece 12, based on the output signals from the light receiving devices 59, 60.

A servo circuit 63 generates a driving signal for actuating a driver 64 to drive the objective lens 57, based on the output signal from the detecting circuit 61. As the objective lens 57 is thus vertically moved, a moving element 67 of a displacement detector 66 is moved relative to a stationary element 68. The amount of movement of the moving element 67 is outputted as the amount of displacement of the objective lens 57, i.e. a change in the coordinate value in the Z-axis direction of the workpiece 12.

Figure 4:
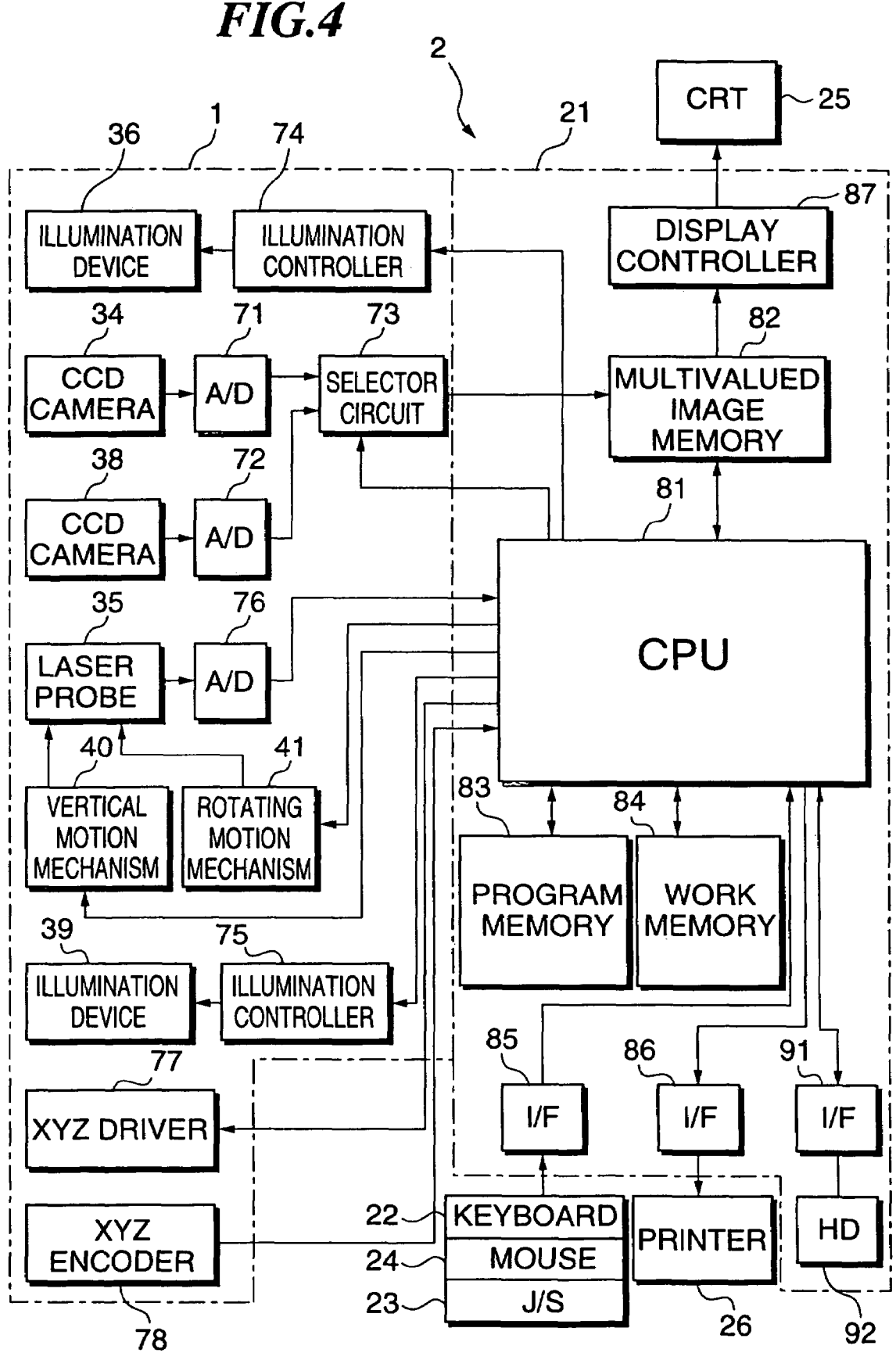
FIG. 4 is a block diagram showing the electrical structures of a three-coordinate measuring machine 1 and a computer system 2.

FIG. 4 shows the electrical structures of the three-coordinate measuring machine 1 and the computer system 2. In the three-coordinate measuring machine 1, image signals obtained by shooting of the CCD camera 34 for image measurement and the CCD camera 38 for confirming the measurement position of the laser probe 35 are converted into multivalued image data by respective A/D converters 71 and 72, and one of the multivalued image data is selected by a selector circuit 73 and supplied to the computer 21.

Illuminating lights required for shooting by the CCD cameras 34, 38 are controlled by respective illumination controllers 74 and 75 which drive illumination devices 36 and 39, respectively. The displacement amount signal from the laser probe 35 is delivered to the computer 21 via an A/D converter 76.

The image pickup unit 17 is driven in the X-axis, Y-axis and Z-axis directions by an XYZ driver 77 that operates under the control of the computer 21. The positions of the image pickup unit 17 in the X-axis, Y-axis and Z-axis directions are detected by an XYZ encoder 78, and signals indicative of the detected positions are delivered to the computer 21.

On the other hand, the computer 21 is comprised of a CPU 81, a multivalued image memory 82, a program memory 83 formed by a ROM, a work memory 84, I/O interfaces 85, 86, and 91, and a display controller 87. The displayer controller 87 displays multivalued image data stored in the multivalued image memory 82 on the CRT display 25.

The CPU 81 causes the selector circuit 73 to select the multivalued image data for image measurement or the multivalued image data for laser measurement according to an image measuring mode or a laser measuring mode. The multivalued image data for image measurement or the multivalued image data for laser measurement is stored in the multivalued image memory 82. The multivalued image data stored in the multivalued image memory 82 is displayed on the CRT display 25 by a display control operation of the display controller 87.

On the other hand, instruction information indicative of instructions inputted through the keyboard 22, joy stick 23 and mouse 24 by an operator is input to the CPU 81 via the interface 85. The CPU 81 also receives data indicative of the displacement amount detected by the laser probe 35, XYZ coordinate information from the XYZ encoder 78, etc.

The CPU 81 operates on these input information, instructions from the operator, and a program stored in the program memory 83 to execute various processes including movement of a stage by the XYZ driver 77, and arithmetic calculation of measured values. The work memory 84 provides work areas for various processes performed by the CPU 81. The calculated measured values are delivered to the printer 26 via the interface 86.

A storage memory 92 formed, e.g. by a hard disk is connected to the CPU 81 via the I/O interface 91 and stores a measurement part program, measurement result data, and analysis result data, which will be described later, and other data.

The three-coordinate measuring system constructed as above can perform measurement of workpieces in two modes, i.e. the image measuring mode using the CCD camera 34 and the laser measuring mode using the laser probe 35. Here, a description will be given of a method of creating a measurement part program that defines a measurement path along which the laser probe 35 is to be moved relative to a workpiece and a method of measuring a Z-axis coordinate value on the workpiece using the laser probe 35.

Figure 5:
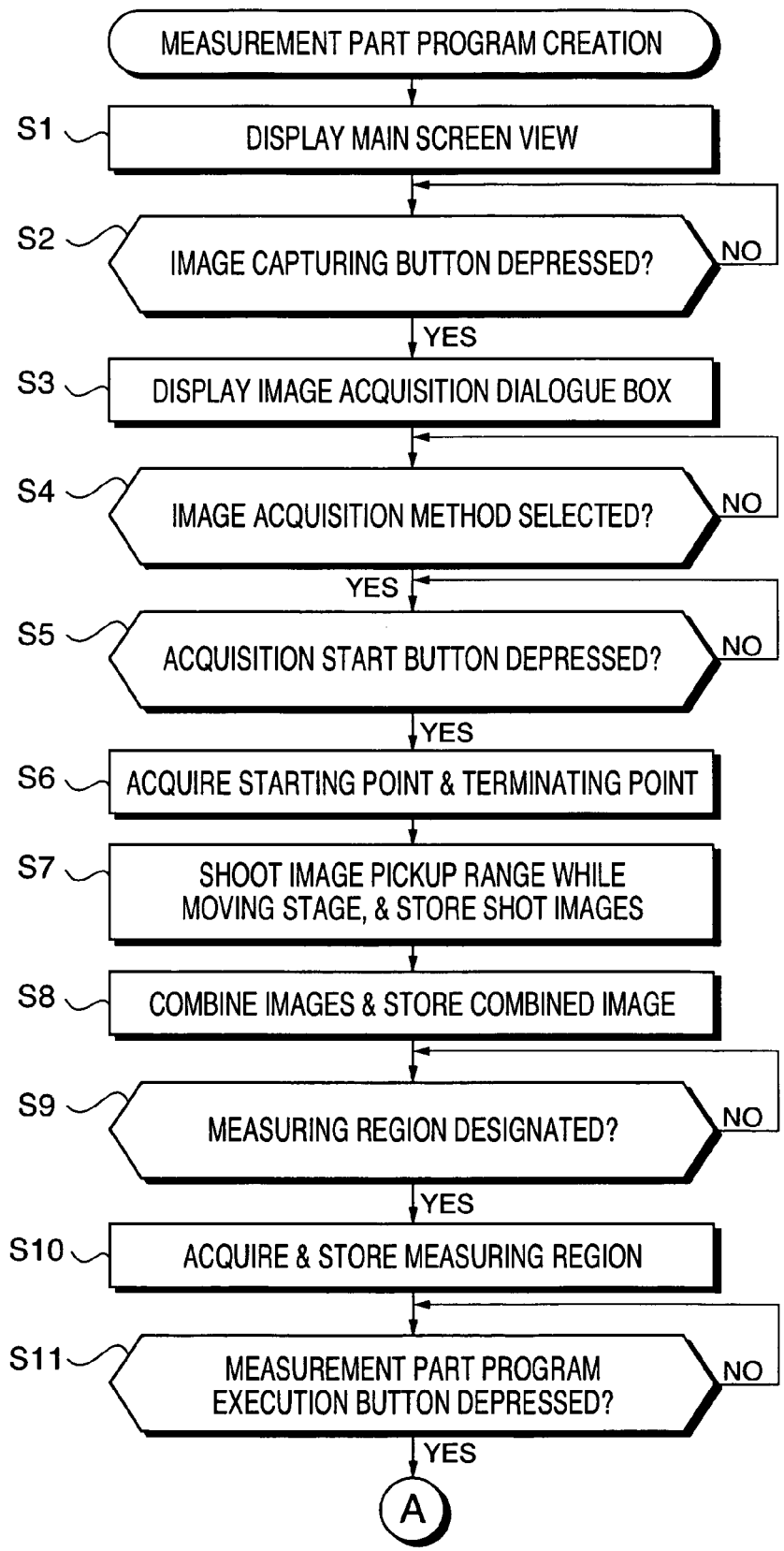
FIG. 5 is a flow chart showing a procedure for creating a measurement part program.
Figure 6:
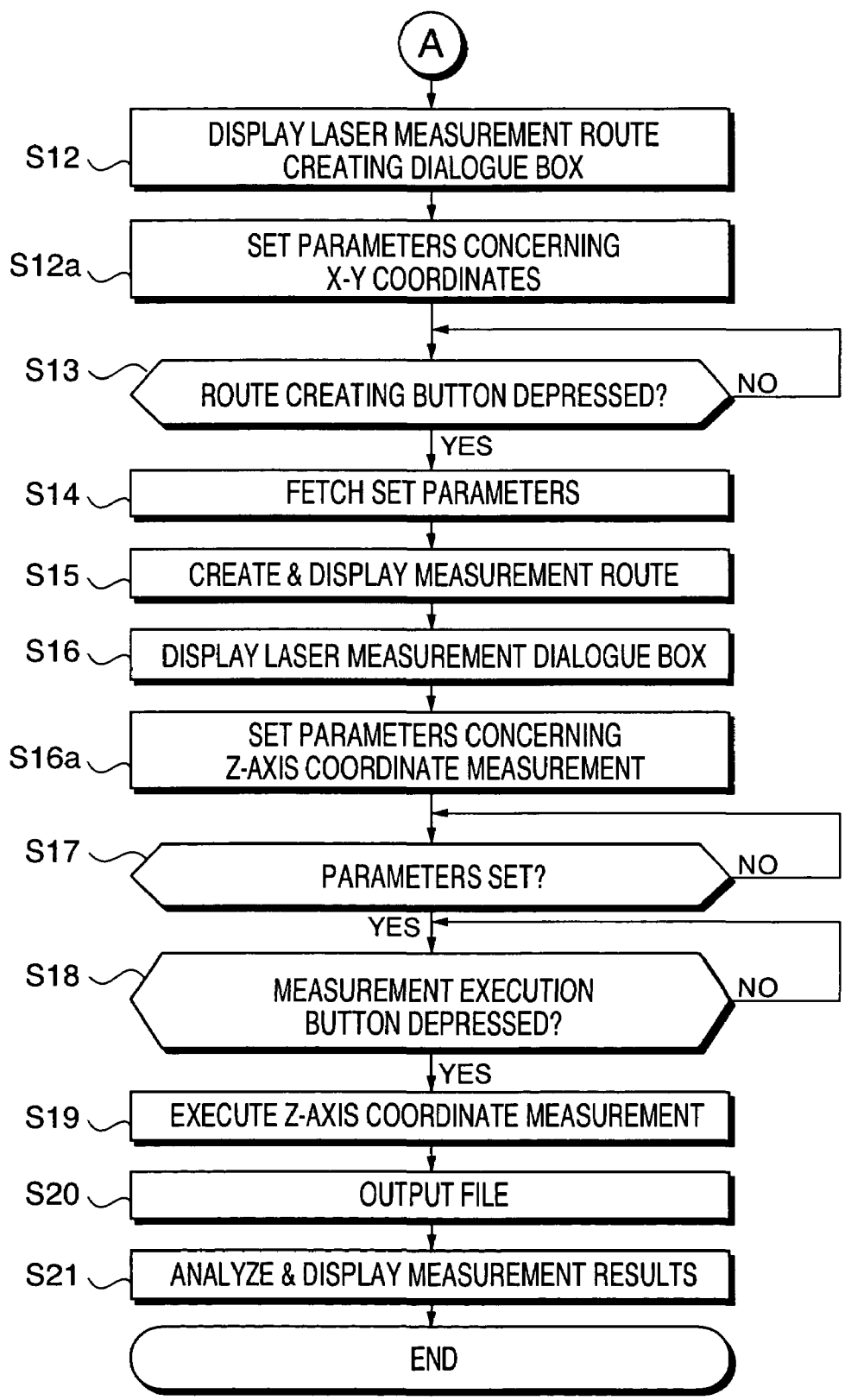
FIG. 6 is a flow chart showing a continued part of the FIG. 5 procedure.

FIGS. 5 and 6 are flow charts showing a procedure for creating a measurement part program. A program for performing this procedure is stored in the program memory 83, and is executed by the CPU 81 upon inputting of a key operation by an operator.

Figure 7:
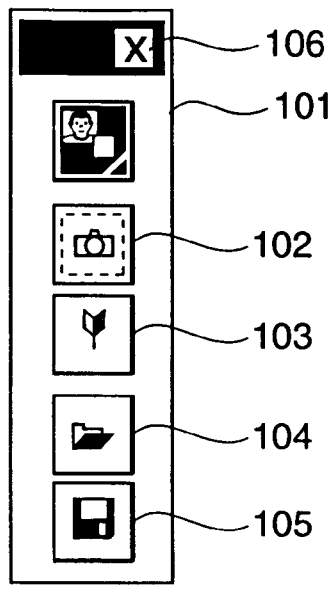
FIG. 7 is a view showing a main screen view 101.

When the program for creating the measurement part program is started, first, a main screen view 101 is displayed on the CRT display 25 (step S1). FIG. 7 shows the main screen view 101. The main screen view 101 contains an image capturing button 102, a measurement part program creation/execution button 103, a file opening button 104, a file saving button 105, and a closing button 106.

Figure 8:
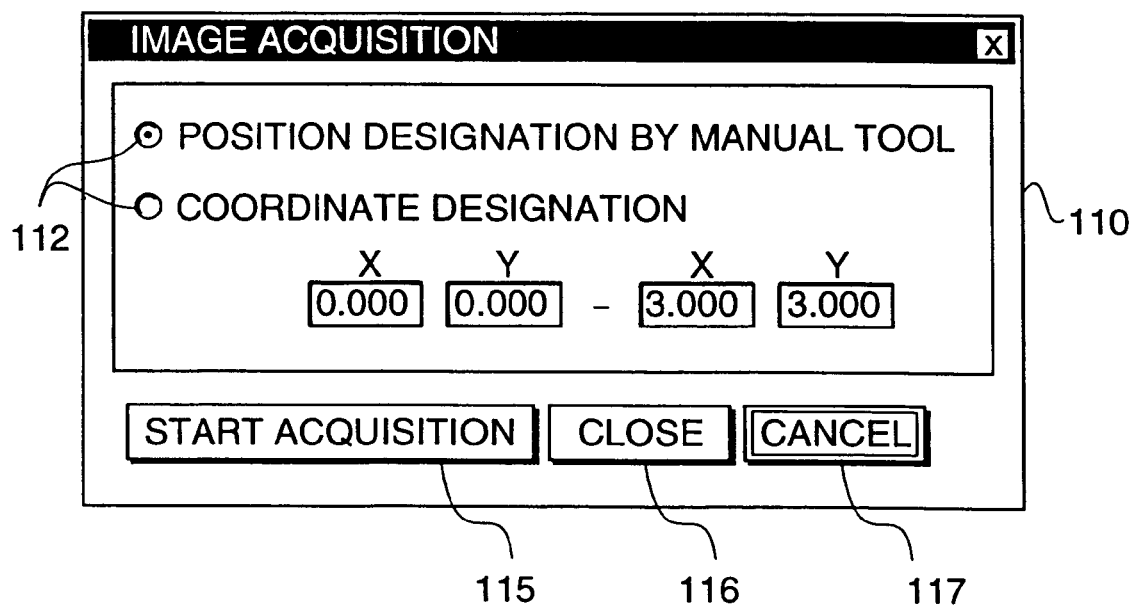
FIG. 8 is a view showing an image acquisition dialogue box 110.

The process waits for the image capturing button 102 to be depressed (clicked) by an operator (step S2). When the image capturing button 102 is depressed, an image acquisition dialogue box 110 is displayed (step S3). FIG. 8 shows the image acquisition dialogue box 110. The image acquisition dialogue box 110 contains a selecting button 112 for selecting an image acquisition method, i.e. "Position Designation by Manual Tool" or "Coordinate Designation", an acquisition start button 115, a closing button 116, and a cancel button 117. When "Coordinate Designation" is selected by the selecting button 112, X-axis and Y-axis coordinates of a starting point and a terminating point can be directly inputted. Here, the case where "Position Designation by Manual Tool" is selected will be described.

Figure 9:
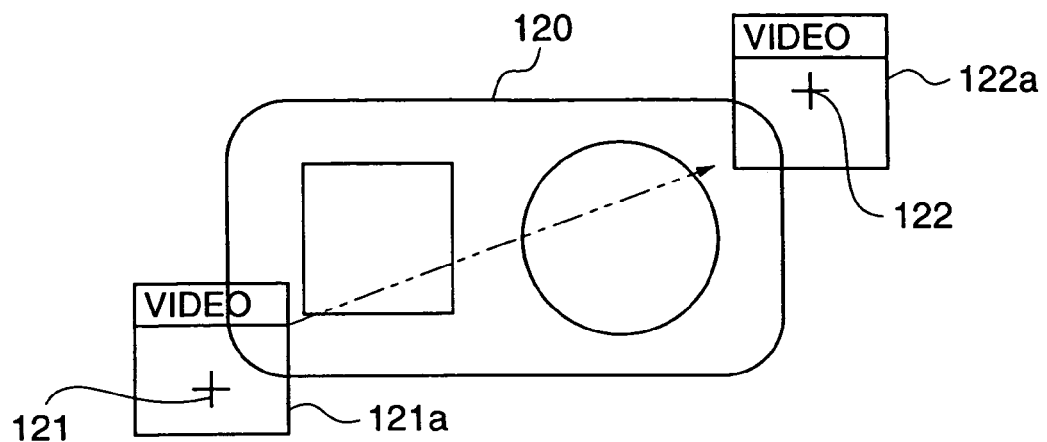
FIG. 9 is a view showing a starting point and a terminating point for image acquisition of a workpiece.

When the image acquisition method is selected by the operator (step S4), the process waits for the acquisition start button 115 to be depressed (step S5). When the acquisition start button 115 is depressed, the starting point and terminating point are obtained with respect to the workpiece to be shot (step S6). More specifically, if the image acquisition method selected at the step S4 is "Position Designation by Manual Tool", the operator moves the measuring table 13 or the CCD camera 38 to move a stage defining the image pickup range, thereby designating the starting point and terminating point with respect to the workpiece at which the shooting is started and terminated, respectively. Thus, X-Y coordinate values at the starting point and the terminating point are designated. FIG. 9 shows the starting point and terminating point for image acquisition of a workpiece. In the example illustrated in FIG. 9, as the workpiece, a base plate 120 having a substantially rectangular shape and formed therein with a square hole and a circular hole is used. In FIG. 9, the center of a cross indicated at a location leftward and downward of the workpiece 120 is set as the starting point 121, and the center of a cross indicated at a location rightward and upward of the workpiece 120 is set as the terminating point 122, thus designating the image pickup range on the X-Y plane. Square frames 121a and 122a enclosing the starting point 121 and the terminating point 122, respectively, indicate the shooting range of the CCD camera 38.

Figure 10:
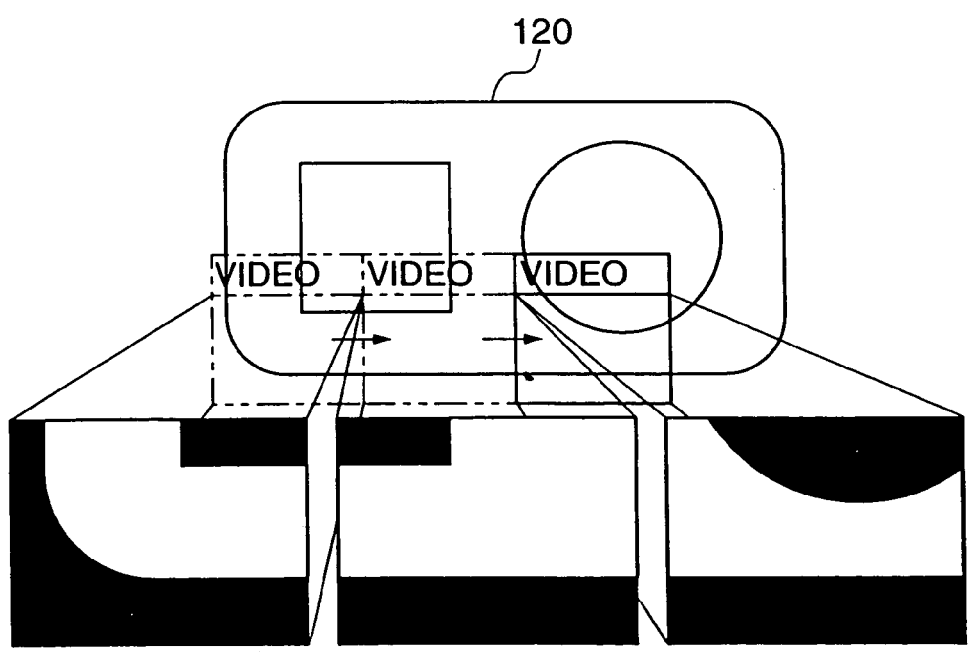
FIG. 10 is a view showing a manner of continuously shooting the workpiece while moving a stage.

The image pickup range thus designated is shot image by image by the CCD camera 38 while moving the stage, and the shot images are automatically stored in the multivalued image memory 82 (step S7). FIG. 10 shows the manner of continuously shooting the workpiece while moving the stage. The individual images are obtained by shooting in such a manner that they do not overlap with each other, and the shot images are stored in the form of a TIFF image file.

Figure 11:
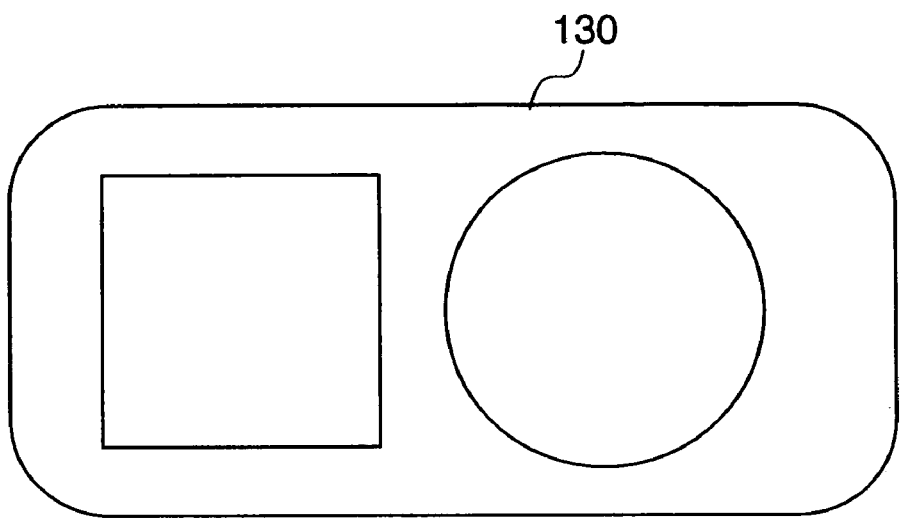
FIG. 11 is a view showing a combined image displayed on a screen.

Next, the images stored in the multivalued image memory 82 are combined together into a single image (combined image), and the combined image 130 is displayed on the CRT display 25 (step S8). FIG. 11 shows the combined image displayed on the CRT display 25. In this connection, in FIG. 11 and FIGS. 12 and 14, referred to later, the gradations of the images are omitted and only the contours are depicted for simplicity's sake. The combined image 130 may be displayed on the CRT display 25 by pasting the combined image on a screen view according to paint software which has been started in advance.

Figure 12:
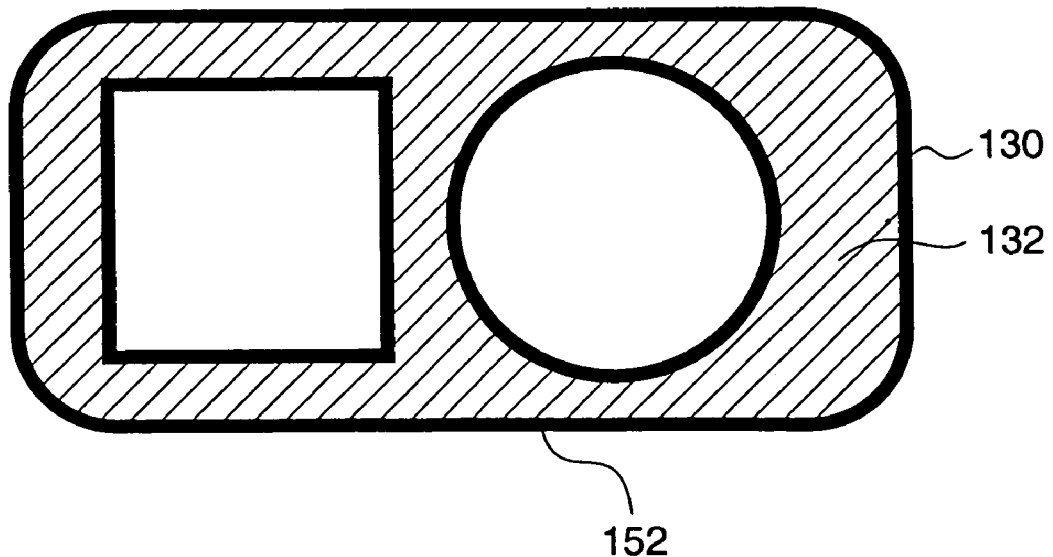
FIG. 12 is a view showing the image after a particular measuring region has been designated by a specific color.

Then, it is determined whether or not a measuring region has been designated for the displayed combined image 130 (step S9). In the present embodiment, the measuring region is designated by painting a specific color such as red. More specifically, the designation can be made in such a manner that the operator paints a specific color using a brush tool or the like on the combined image 130 pasted on the screen view according to the paint software. FIG. 12 shows the combined image 130 after the measuring region has been designated by a specific color or red. In FIG. 12, a hatched region 132 indicating the region) painted red is the designated measuring region. In the figure, margin regions 152 are indicated by thick rims. In the screen view, the margin regions 152 are indicated by yellow. In this way, the operator can very easily designate the measuring region. Alternatively to painting a specific color, the measuring region may be enclosed by lines using a pen tool, or the enclosed region may be highlighted such that black and white are reversed. For example, in the case where a workpiece is shot against the light by a monochromatic camera, the resulting image is such that holes formed in the workpiece are bright due to light passing through the holes, and the other portions are dark. The bright portions and the dark portions are reversed to indicate the measuring region. The measuring region that has been thus designated is stored together with the combined image in the multivalued image memory 82 (step S10).

Figure 13:
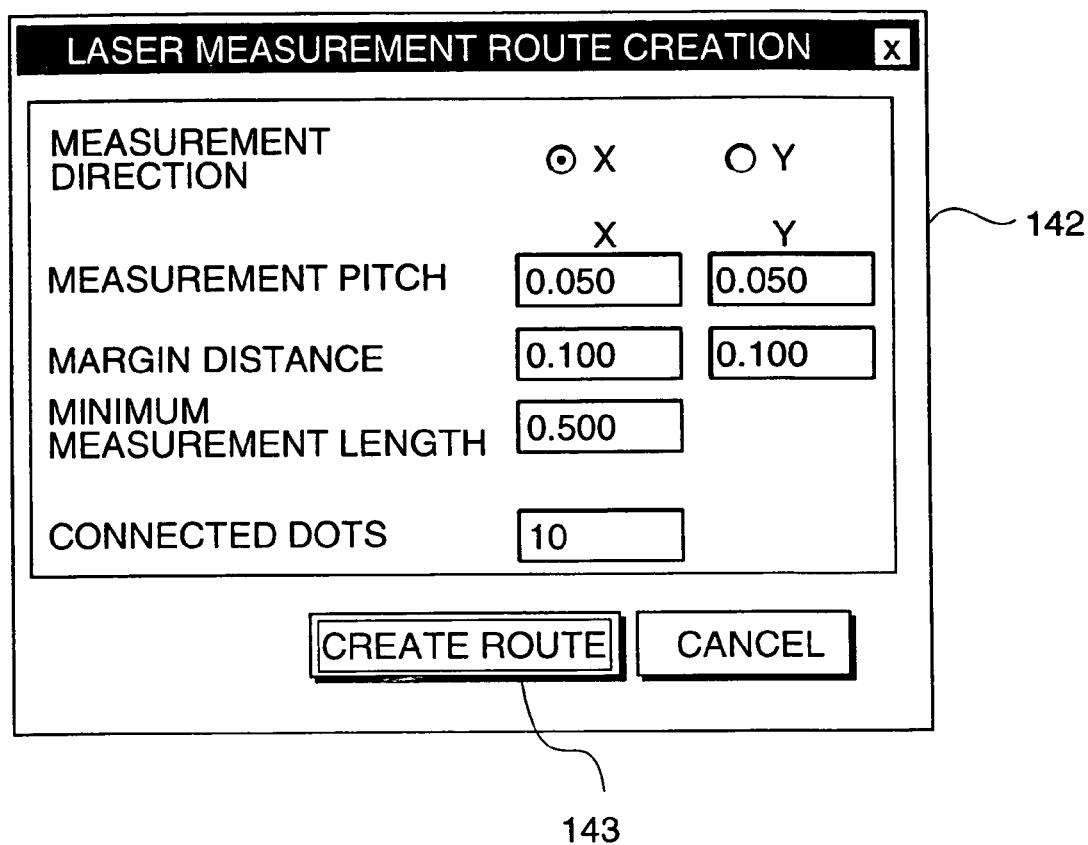
FIG. 13 is a view showing a laser measurement route creating dialogue box 142.

Then, the process waits for the measurement part program creation/execution button 103 in the main screen view of FIG. 7 to be depressed (step S11). When the button 103 is depressed, a laser measurement route creating dialogue box 142 is displayed to input various parameters forming conditions for specifying a pattern of a laser measurement route (step S12). FIG. 13 shows the laser measurement creating dialogue box 142. In this dialogue box 142, values of parameters for a default measurement route pattern are first displayed. According to the laser measurement creating dialogue box 142, it is possible to set direction of measurement, measurement pitch, margin distance, minimum measurement length, and connected dots. In setting "Margin Distance", a margin from an end face of the measuring region to a location to be actually measured can be set so as to absorb variations in shape between workpieces. In setting "Minimum Measurement Length", the minimum measurement length per one measurement can be set so as to secure a measurement length required for filtering of the measurement results. In setting "Connected Dots", the minimum number of pixels (dots) can be set so as to remove noise components such as abnormal dots contained in the image within an area of the set number of pixels (dots). Since the three-coordinate measuring machine thus has the above function of setting various parameters, it has enhanced operatability.

Figure 14:
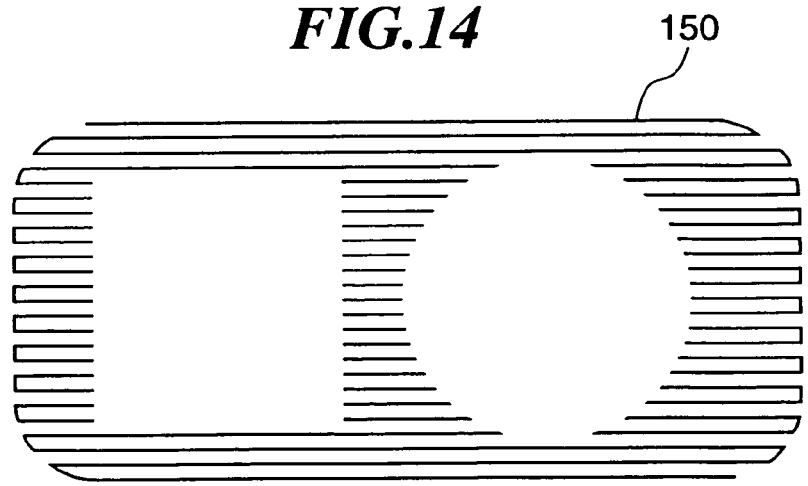
FIG. 14 is a view showing only a measurement route which is displayed on the screen in a manner being superimposed on the combined image.

Then, in the laser measurement creating dialogue box 142, various parameters are set by inputting desired values for the parameters (step S12a). Then, it is determined whether or not a route creating button 143 has been depressed (step S13). If the route creating button 143 is depressed, the parameters set by the laser measurement route creating dialogue box 142 are fetched (step S14), and a measurement part program (laser measurement route) is created according to the set parameters and displayed (step S15). The created measurement part program is related to a two-dimensional measurement route based on the parameters concerning the X-Y coordinates. FIG. 14 shows only the measurement route which is displayed on the screen in a manner being superimposed on the combined image. In the illustrated example, the measurement route 150 is displayed in blue lines on the screen view according to the aforementioned paint software and represents a path moving in a reciprocating manner in the X-axis direction at the set measurement pitch, within the measuring region. In FIG. 14, blank portions corresponding to holes are not measured and promptly passed by the laser probe.

The measurement part program thus created is once stored in the work memory 84, and then registered in the storage memory 92 formed, e.g. by a hard disk via the I/O interface 91.

Figure 15:
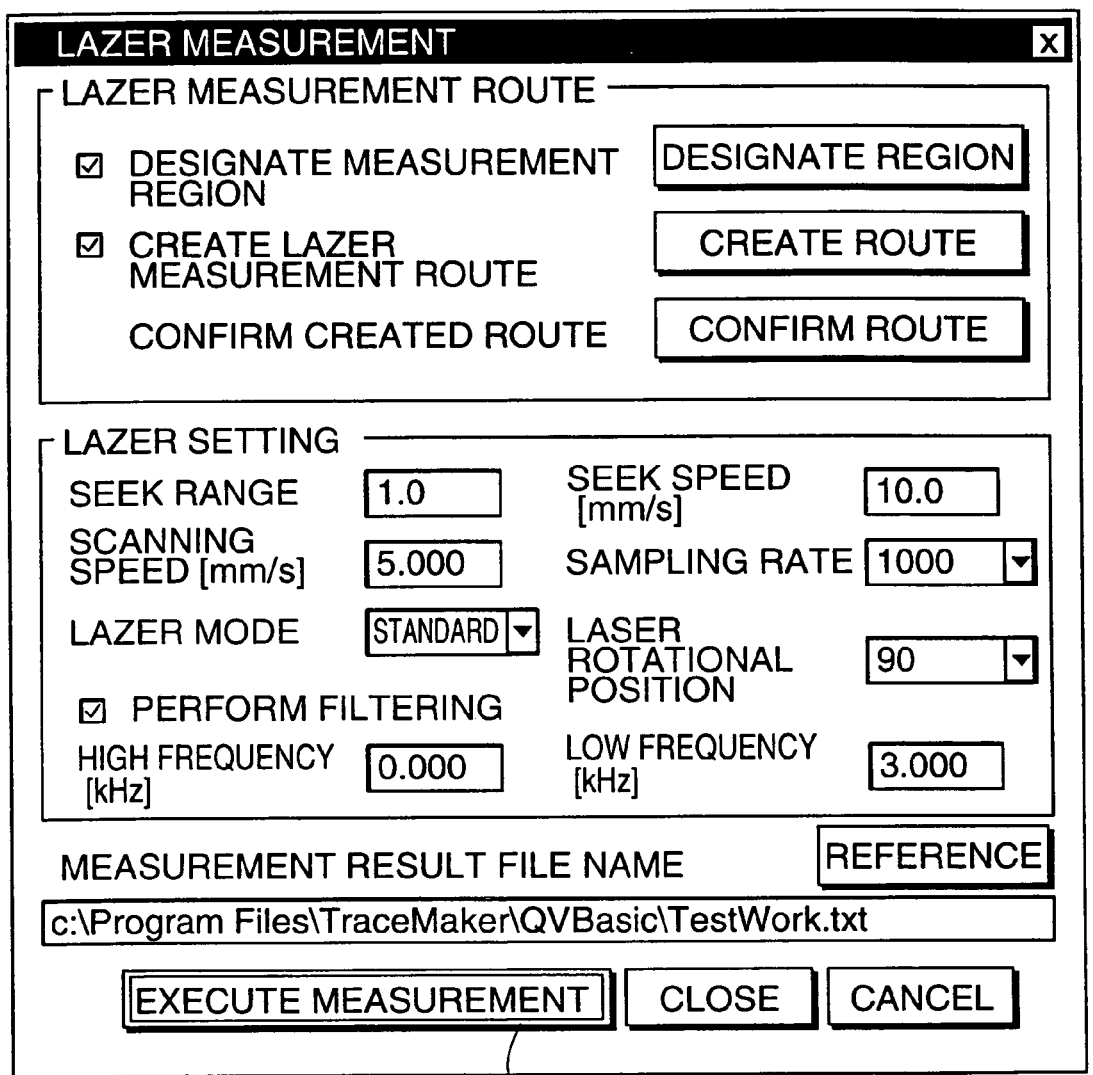
FIG. 15 is a view showing a laser measurement dialogue box 161.

After the measurement part program has thus been created, a laser measurement dialogue box 161 is displayed (step S16). FIG. 15 shows the laser measurement dialogue box 161. The laser measurement dialogue box 161 contains various parameters required for a Z-axis coordinate measurement using the laser probe 35, including seek range, seek speed (mm/s), scanning speed (mm/s), sampling rate, laser mode, laser rotational position, setting as to whether to perform filtering, high frequency (kHz), and low frequency (kHz). Buttons are provided in an upper portion of the laser measurement dialogue box 161, for region designation, route creation, and route confirmation, which are depressed in manually setting the laser measurement route.

Various parameters concerning the Z-axis coordinate measurement are set by inputting desired values for the parameters (step S16a). Then, it is determined whether or not these parameters required for laser measurement have been set by the operator (step S17). If they have been set, the measurement part program is finalized, and then it is determined whether or not a measurement execution button 162 has been depressed (step S18).

If the measurement execution button 162 has been depressed, the Z-axis coordinate measurement is carried out according to the created measurement part program with a laser beam from the laser probe 35 being scanned in the Z-axis direction along the measurement route (step S19). The Z-axis coordinate measurement measures dimensions of the workpiece in the height direction by determining a focus point from the contrast of the screen to thereby determine an amount of displacement of the objective lens 57 as a change in the Z-axis coordinate value. Measurement result data thus obtained are outputted in the form of a file to the hard disk 92 via the I/O interface 91 (step S20).

Figure 16:
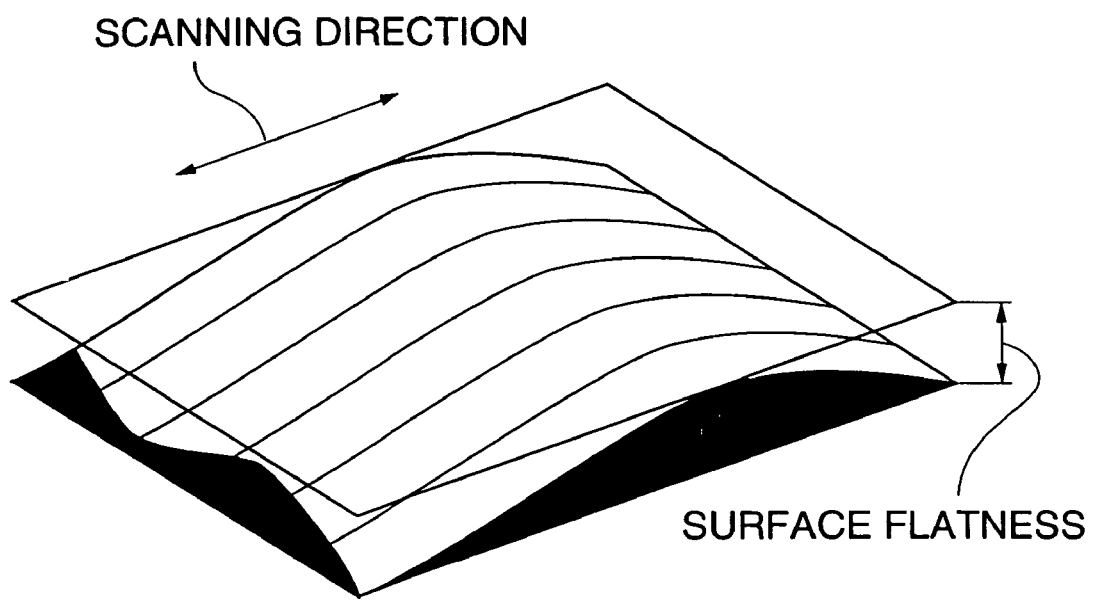
FIG. 16 is a view showing data obtained by the measurement with a surface flatness of the workpiece displayed as a result of analysis of the data.

Further, an analysis program is started to analyze the measurement result data, and results of the analysis including surface flatness and runout are displayed together with the measurement result data on the CRT display 25 (step S21). FIG. 16 shows the surface flatness as a result of the analysis displayed on the CRT display 25. The surface flatness data is obtained by analysis of data generated from the above determined Z-axis coordinate value and the X axis and X-Y coordinate values along the measurement route. As the method for carrying out the analysis, a method as disclosed by Japanese Laid-Open Patent Publication (Kokai) No. 11-351858 can be used, and description of the same is, therefore, omitted.

In the above described manner, according to the three-coordinate measuring system of the present embodiment, a Z-axis coordinate measurement is carried out according to the measurement part program (measurement route) merely by designating a measuring region on the two-dimensional X-Y plane (YES to the step S9) and inputting necessary parameters (steps S12a, S16a). Therefore, it is possible to quickly create a measurement part program with ease and quickly carry out a three-dimensional measurement even if an object to be measured has a complicated shape or configuration. Further, since a combined image obtained by combining together images stored in the multivalued image memory 82 is displayed n the display 25 (step S8), even a measurement route for an object to be measured, which cannot come within the view range of the camera, can be set with ease.

Figure 17A:
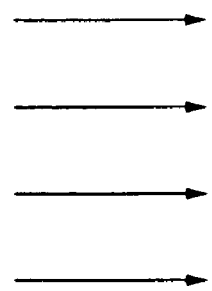
FIGS. 17A to 17C are views showing other patterns of measurement routes.
Figure 17B:
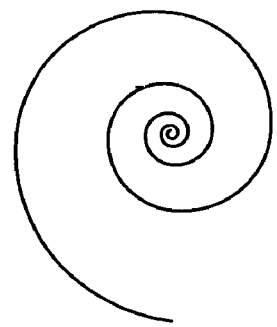
Figure 17C:
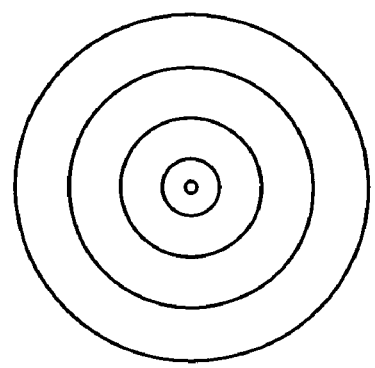

Although in the above described embodiment, the pattern for the measurement route represents a path moving in a reciprocating manner in the X-axis direction or the Y-axis direction at the set measurement pitch, the pattern is not limited to this. Alternatively, other patterns as shown e.g. in FIGS. 17A to 17C may be used. The pattern of FIG. 17A represents a path moving only in one direction at a set measurement pitch, the pattern of FIG. 17B represents a spiral path, and the pattern of FIG. 17C represents a concentric-circular path. The selection of these patterns may be carried out using the laser measurement route creating dialogue box shown in FIG. 13, referred to above.

Although in the above described embodiment, the creation of a measurement part program and the execution of the same are started in a sequential manner by operating the same button, they may be started separately. That is, a button for measurement part program creation and a button for measurement part program execution may be separately provided on the main screen view.

Further, although in the above described embodiment, the present invention is applied to an optical Z-axis coordinate measuring system (surface measuring system), the present invention is not limited to such a optical Z-axis coordinate measuring system, but may be applied to various types of measuring systems such as a profile measuring system, a carbon measuring system, and an element analysis apparatus, and may also be applied to a contact measuring system using a touch sensor in place of the laser probe.

Although in the above described embodiment, monochromatic images are combined together and displayed, color images may be picked up by a color CCD camera, and may be combined together and displayed.

Figure 18:
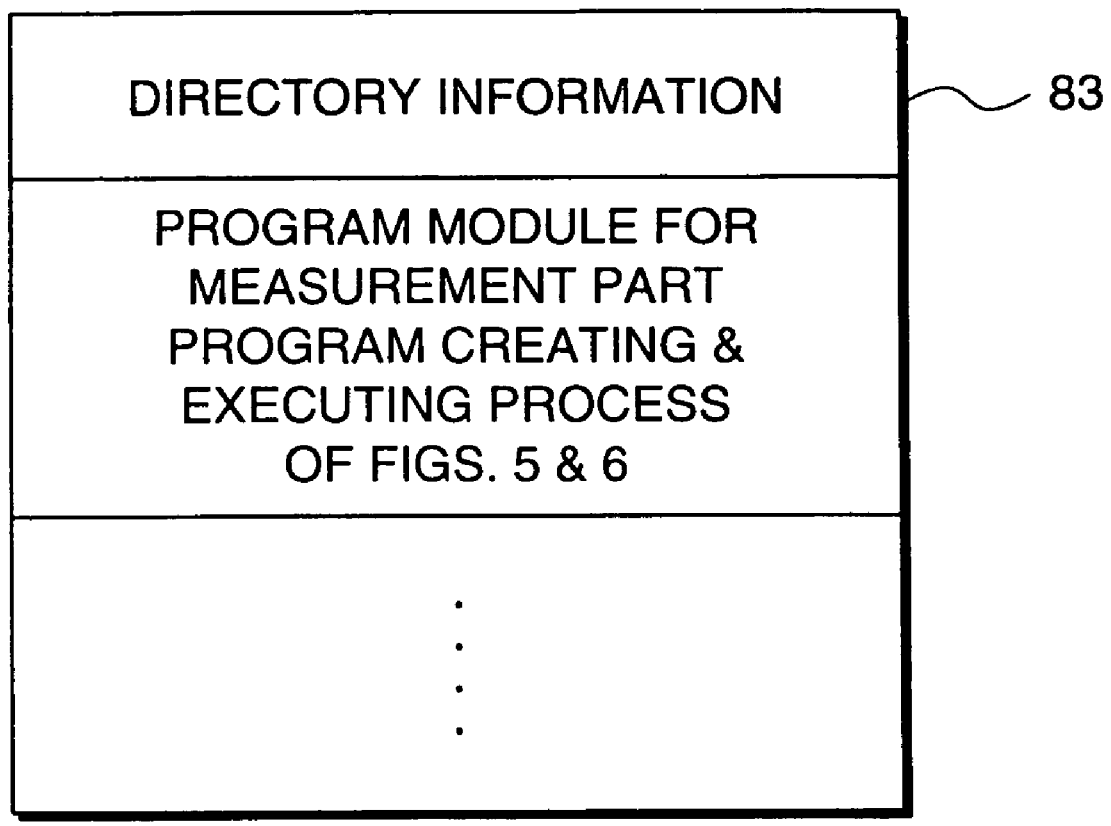
FIG. 18 is a view showing a memory map provided in a program memory 83.

The present invention can be also realized in the form of a storage medium which can be installed in a three-coordinate measuring system. FIG. 18 shows a memory map provided in the program memory 83. The program memory 83 is formed by a ROM as mentioned above, and stores a program module for executing the measurement part program creating and executing process shown in FIGS. 5 and 6. A storage medium that contains this program module is not limited to the ROM, but may be a floppy disk, a hard disk, an optical disk, a magneto-optical disk, CD-ROM, CD-R, DVD, and a non-volatile memory card.

What is claimed is:

1. A measuring method comprising:
   shooting an object to be measured;
   combining together a plurality of images obtained by the shooting to generate a combined image of the object;
   designating a measuring region of the generated combined image;
   inputting at least one first parameter for creating a measurement path and required for measurement in X-axis and Y-axis directions to create the measurement path measuring program;
   inputting at least one second parameter required for measurement in a Z-axis direction to finalize the created measurement path measuring program; and
   measuring the designated measuring region along the measurement path according to the finalized measurement path measuring program.

2. A measuring method as claimed in claim 1, wherein said step of shooting the object comprises shooting part of the object with a camera attached to a measuring tool for use in measuring the object, while moving the camera and the object relative to each other.

3. A measuring method as claimed in claim 1, further comprising displaying the combined image, wherein the designating the measuring region comprises designating the measuring region by painting a specific color on the displayed image of the object.

4. A measuring method as claimed in claim 3, further comprising displaying the created measurement path in a manner being superimposed on the displayed combined image.

5. A measuring method as claimed in claim 2, further comprising setting a range of image pickup by the camera by designating a starting point and a terminating point with respect to the object for shooting.

6. A measuring system comprising:
   shooting means for shooting an object to be measured;
   image generating means for combining together a plurality of images obtained by the shooting to generate a combined image of the object;
   designating means for designating a measuring region of the generated combined image;
   program creating means for receiving an input of at least one first parameter for creating a measurement path and required for measurement in X-axis and Y-axis directions to create the measurement path measuring program, and for receiving an input of at least one second parameter required for measurement in a Z-axis direction to finalize the created measurement path measuring program; and
   measuring means for measuring the designated measuring region along the measurement path according to the created measurement path measuring program.

7. A storage medium on which is recorded a computer program for causing a computer to execute a measuring method, the measuring method comprising:
   shooting an object to be measured;
   combining together a plurality of images obtained by the shooting to generate a combined image of the object;
   designating a measuring region of the generated combined image;
   inputting at least one first parameter for creating a measurement path and required for measurement in X-axis and Y-axis directions to create the measurement path measuring program;
   inputting at least one second parameter required for measurement in a Z-axis direction to finalize the created measurement path measuring program; and
   measuring the designated measuring region along the measurement path according to the created measurement path measuring program.

* * * * *